United States Patent [19]
Fiala et al.

[11] Patent Number: 5,999,709
[45] Date of Patent: *Dec. 7, 1999

[54] PRINTER MEMORY BOOST

[75] Inventors: Edward R. Fiala, Sunnyvale; Noam Lorberbaum; Loretta G. Reid, both of Palo Alto, all of Calif.

[73] Assignee: Adobe Systems Incorporated, San Jose, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/844,009

[22] Filed: Apr. 18, 1997

[51] Int. Cl.$^6$ .............................. B41B 15/00; B41J 15/00; B41F 15/00
[52] U.S. Cl. .......................... 395/114; 395/116; 395/117
[58] Field of Search .................................... 395/114, 115, 395/116, 117

[56] References Cited

U.S. PATENT DOCUMENTS

| | | | |
|---|---|---|---|
| 5,247,634 | 9/1993 | Cline et al. | 707/205 |
| 5,483,622 | 1/1996 | Zimmerman et al. | 395/114 |
| 5,490,237 | 2/1996 | Zimmerman et al. | 395/115 |
| 5,500,928 | 3/1996 | Cook et al. | 345/433 |
| 5,502,462 | 3/1996 | Mical et al. | 345/199 |
| 5,506,944 | 4/1996 | Gentile | 395/114 |
| 5,602,976 | 2/1997 | Cooper et al. | 395/116 |
| 5,638,498 | 6/1997 | Tyler et al. | 395/117 |
| 5,729,668 | 3/1998 | Clafin et al. | 395/114 |
| 5,793,937 | 8/1998 | Chura et al. | 395/115 |
| 5,867,632 | 2/1999 | Andree et al. | 395/109 |

*Primary Examiner*—Jon Chang
*Assistant Examiner*—Mehrdad Dastouri
*Attorney, Agent, or Firm*—Fish & Richardson P.C.

[57] ABSTRACT

A method and apparatus for allocating memory usage in a visual output device having a render engine, a display list memory for storing display list objects and a compressed band buffer memory for storing compressed bitmap data rendered by the render engine. The method includes storing display list objects in the display list memory and detecting that the display list memory is full. Upon detecting the display list memory is full and determining that the compressed band buffer memory is not full, display list data is transferred from display list memory to the compressed band buffer memory, thereby freeing space in the display list memory space for more display list objects.

17 Claims, 3 Drawing Sheets

PRINTER MEMORY BOOST

The present invention relates generally to the processing of page description language data by printers and other visual output devices, and more particularly to methods and apparatus for optimizing memory usage in such devices.

BACKGROUND

Printers and other visual output devices that produce output in response to page description language input are widely used. A page description language is a high level language for describing objects to be displayed by an output device. Generally, a page description language is device independent.

In operation, a conventional printer configured to process page description language data interprets the data and transfers the data in display list form to a display list memory. As the display list memory fills, the display lists are rendered into bitmap and stored. The printer has a memory buffer large enough to store (in compressed form) any page that might be printed, and rendered bitmap are generally compressed and stored in this buffer. When the entire page has been rendered, all the rendered data has generally been compressed, and that compressed data is uncompressed and transferred to a print engine or marking engine for printing.

Typically, a printer divides a page into multiple sections called bands that are printed in order. A data object defined by page description language input may span more than one band. Such objects are segregated by the printer to create a display list object for each portion of a data object that intersects a band. As a result, each display list has objects limited to exactly one band. As has been mentioned, these display list objects are transferred to display lists stored in the display list memory.

One problem with conventional printers is that, as data objects are processed, display list memory fills before all the objects for a page had been received. In response, the printer renders the display list objects to free up memory for more objects. Conventional printers have dedicated rendered memories or memory areas separated by fire walls for each of (i) the display lists, (ii) uncompressed output data storage, and (iii) compressed band data storage. Each dedicated memory is sized according to overall system requirements to guarantee correct operation under all circumstances. Accordingly, the dedicated memory resources do not provide a great deal of flexibility in the storage of data.

Cycling is the term applied to the repetitive process of transforming data stored in display lists into compressed data stored in compressed storage. The process begins when a display list is filled, and terminates in the storage of one or more bands in compressed storage. An intermediate step generally includes the decompression of compressed data previously stored, so that new data may be rendered and added to it. Cycling is time consuming, results in inefficiencies, and may result in unnecessary compression and hence loss of fidelity in the printing of a page.

SUMMARY

In one aspect the invention provides a method for allocating memory usage in a visual output device having a render engine, a display list memory for storing display list objects and a compressed band buffer memory for storing compressed bitmap data rendered by the render engine. The method includes storing display list objects in the display list memory and detecting that the display list memory is full. Upon detecting the display list memory is full and determining that the compressed band buffer memory is not full, display list data is transferred from display list memory to the compressed band buffer memory, thereby freeing space in the display list memory space for more display list objects.

Preferred embodiments of the invention include the following features. The visual output device is a printing device configured to receive and process page description language input describing a page to be printed. The page description language input is written in the PostScript language or the PCL language The method further includes performing a cycling process transforming display list objects into rendered data for storage in the compressed band buffer memory when both the display list memory and the compressed band buffer memory are deemed full for the purpose of storing further display list objects. A memory space occupied by the display list objects rendered by the cycling process is released. The cycling process includes determining a band size for each band having display list objects stored in the display list memory or the compressed band buffer memory and performing the cycling process for large bands in preference to small bands.

The band size is the sum of the amount of memory occupied by the display lists for the band and the amount of memory already occupied by the band in the compressed data buffer memory. Rendering a band includes decompressing compressed band data for the band from the compressed band buffer memory, storing the result in an uncompressed band buffer memory and rendering each display list for the band into band data stored in the uncompressed band buffer memory.

The compressed band buffer memory is deemed full if insufficient space exists in compressed band buffer memory to store any of the display list objects from display list memory. The compressed band buffer memory is sized to store a worst-case single page in its most compressed form.

In another aspect, the invention provides a method for allocating memory usage in a printer configured to receive a page description language description of a page to be printed. The printer has a display list memory for storing display list objects and a compressed band buffer memory for storing compressed bitmap rendered by the printer. The method includes interpreting page description language input into display list objects stored in display lists in the display list memory of the printer until the display list memory is deemed full. Display list data from the display list memory is transferred to the compressed band buffer memory in response to the display list memory being deemed full before continuing to interpret page description language input, unless the compressed band buffer memory is deemed full.

Preferred embodiments include the following features. Display list data is rendered into an uncompressed band buffer memory when both the display list memory and the compressed band buffer memory are deemed full, whereby memory space is made available to continue interpreting page description language input into display list objects stored in display lists in the display list memory.

In another aspect, the invention provides a method for allocating memory usage in a printer configured to receive a page description language description of a page to be printed. The printer has a consolidated memory for storing both display list objects and bitmap rendered by the printer. The method includes interpreting page description language input into display list objects stored in the consolidated memory until the consolidated memory is deemed full and rendering display list data into an uncompressed band buffer memory when the consolidated memory is deemed full. Memory space is made available to continue interpreting page description language input and storing display list objects in the consolidated memory.

Preferred embodiments include the follow features. A band of data from the uncompressed band buffer memory is compressed and stored in the consolidated memory. A compressed band from the consolidated memory may be decompressed into the uncompressed band buffer memory before rendering further display list objects into the band.

In another aspect, the invention provides a printer configured to receive a page description language description of a page to be printed. The printer includes an interpreter connected to receive page description language input and operating to generate display list objects and cause display list objects to be stored in a display list memory, a rendering engine coupled to the display list memory and operating to receive display list objects stored in the display list memory and to render the objects into an uncompressed band buffer memory. The uncompressed band buffer memory is a memory for storing in uncompressed form at least one band of rendered data. The printer includes a data compression engine coupled to the uncompressed band buffer memory and operating to receive and compress rendered data from the uncompressed band buffer memory and to store compressed data in a compressed band buffer memory. The compressed band buffer memory is sufficiently large to store any full page in some compressed form. Finally, the printer includes a memory manager connected to receive a signal indicating that the display list memory is full. In response to the signal, the memory manager transfers display lists from the display list memory to the compressed band buffer memory unless the compressed band buffer memory is also full.

In another aspect the invention provides a method for allocating memory usage in a visual output device having a render engine, a display list memory for storing display list objects and a compressed band buffer memory for storing compressed bitmap data rendered by the render engine. The method includes storing display list objects in the display list memory and detecting that the display list memory is full. Upon detecting the display list memory is full and determining that the compressed band buffer memory is not full, display list data is allocated from display list memory to the compressed band buffer memory, thereby freeing space in the display list memory space for more display list objects.

The invention has numerous advantages. Cycling time is minimized in the rendering of a page of data. Printer memory may be more freely allocated to take advantage of free space in portions of memory so as to minimize the amount of cycling required to render a page of data. Fewer pages will require lossy compression during processing resulting in fewer lossy pages produced by the output display device.

Other advantages and features will be apparent from the following description and claims.

DETAILED DESCRIPTION

The present invention may be embodied in any output display device that receives page description data and produces from the data visual output, for example on a computer monitor or a piece of paper. The invention has particular applicability to printing devices and will be described in terms of an embodiment in such a device, which will be referred to simply as a printer.

Figure 1:
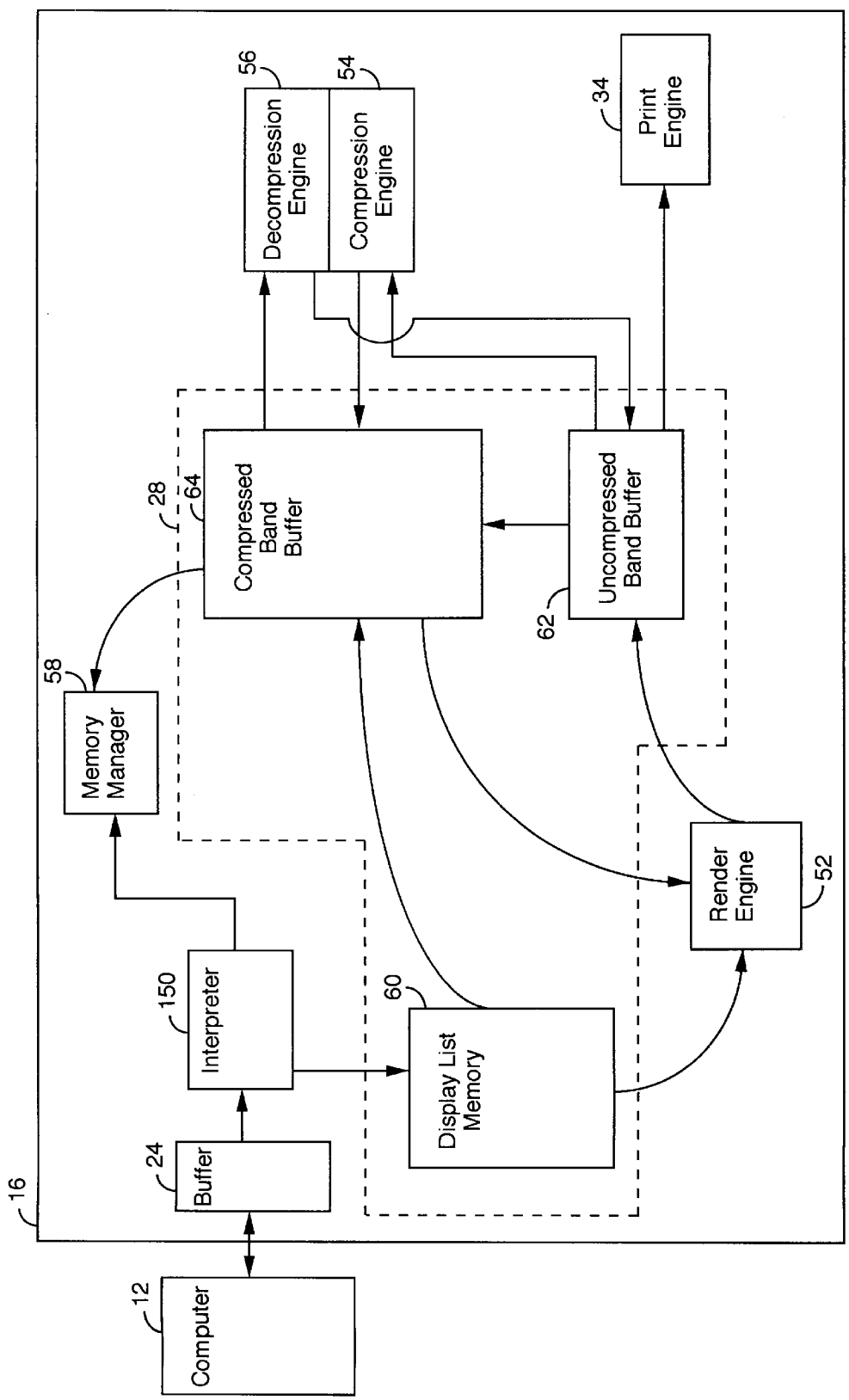
FIG. 1 is a block diagram of a printer according to the invention.

Referring to FIG. 1, a printer 16 receives input data, from a computer 12, for example, and ultimately turns the input data into marks on a piece of paper by sending signals to a print engine 34. The printer 16 is configured to receive page description language input data and process it as will be described later. One suitable page description language is the PostScript® language available from Adobe Systems Incorporated of San Jose, Calif. The PostScript language is described in Adobe Systems Incorporated, Adobe Postscript® Language Reference Manual, Addison-Wesley (2d ed., ©1990). Another suitable page description language is the PCL language available from Hewlett Packard of Palo Alto, Calif. A page description language file sent to a printer specifies objects to be displayed and related information. A PostScript object can, for example, include a bit map defining a pattern of pixels to be displayed, or it can reference an outline curve defining in mathematical terms a shape to be marked. The object may also include other rasterizing information such as font and size.

The printer 16 includes a buffer 24 and a digital data processor, random access memory 28, and print engine 34. It also includes read-only memory, I/O interfaces, and data transfer paths and busses, none of which are shown.

The buffer 24 is a memory buffer used to buffer input data received by the printer from a source such as a computer 12.

The processor may be a general or special purpose microprocessor operating under control of computer program instructions executed from a random access memory. In the embodiment illustrated in FIG. 1, the processor includes a number of special purpose sub-processors including an interpreter 50, a render engine 52, a compression engine 54, a decompression engine 56, and a memory manager 58. Each sub-processor may be a separate circuit able to operate substantially in parallel with the other sub-processors. Some or all of the sub-processors may be implemented as computer program processes (software) tangibly stored in a memory to perform their respective functions. These may share an instruction processor, such as a general purpose integrated circuit microprocessor, or each sub-processor may have its own processor for executing instructions. Alternatively, some or all of the sub-processors may be implemented in an ASIC (application specific integrated circuit).

RAM 28 is random access memory used by the processor (sub-processors 50–58). RAM 28 includes display list memory 60, uncompressed band buffer memory 62 (hereinafter the uncompressed band buffer), and compressed band buffer memory 64 (hereinafter the compressed band buffer). As is conventionally done to insure correct operation, compressed band buffer 64 is sized to hold the worst-case page content in a compressed form, and uncompressed band buffer 62 is sized to hold at least one band of a page in uncompressed form. For better performance, uncompressed band buffer 62 may be sized to hold at least four bands, so that compression operations may be performed on one band, for example, while rendering operations are performed on another. Display list memory 60 is advantageously sized to store a number of display lists. Typically, the uncompressed band buffer is small relative to the compressed band buffer. RAM 28 may be embodied in one or more memory chips. If display list memory 60, uncompressed band buffer 62 and compressed band buffer 64 are consolidated into a single memory (a consolidated memory), then the memory may be partitioned—for example, by the use of fire walls, which may be placed according to the size of the page to be printed—or otherwise mapped to reflect the boundaries of the various memory sub-components.

Data flow, rather than physical interconnection, is illustrated between elements of printer 16. Processor and memory components are physically interconnected using a conventional bus architecture.

Interpreter 50 reads page description language commands and data from buffer 24 and interprets the commands generating objects for storage in display list memory 60. Render engine 52 renders objects in a display list in the display list memory 60 into a band of uncompressed band buffer 62, which stores an uncompressed bitmap or pixel map of a band of the output page. As required, compression engine 54 compresses an uncompressed band according to a selected compression algorithm and stores it in compressed band buffer 64. Decompression engine 56 decompresses the bit maps or pixel maps into the uncompressed band buffer 62 as required, for example, before sending them to the print engine 34 to be printed.

The memory manager 58 manages the allocation of compressed band buffer 64 for compressed band data and possibly display list data. In the methods described later, memory manager 58 may receive a request from the interpreter 50 to determine whether space is available in the compressed band buffer to store display lists. If space is available, memory manager 58 oversees a transfer of display lists from display list memory 60 to compressed band buffer 64. Alternatively, the memory manager may oversee the allocation of memory in the compressed band buffer according to a memory map, and no physical transfer may be required.

The printer components that have been described can be packaged in a single product; alternatively, some can be included in a computer 12 or otherwise housed separately.

Render engine 52 renders display lists, whether stored in display list memory 60, or in compressed band buffer 64. Preliminaries to this process may include the decompressing by decompression engine 56 of previously compressed band data stored in the compressed band buffer for any bands which are to be rendered in the current cycle. The bitmaps rendered into uncompressed band buffer 60 may be compressed immediately and stored in compressed band buffer 64 or they may be left until the part of the uncompressed band buffer they occupy is required for other purposes. When the page is ready to be printed, decompression engine 56 decompresses the bands in display order and places the bitmaps in uncompressed band buffer 62, from which they may be transferred to print engine 34. Alternatively, a process may intercede and directly route bands to print engine 34 if the display order permits, to avoid unnecessary compression followed by immediate decompression of a particular band.

It may occur that the display list memory 60 becomes full and the memory manager 58 finds the compressed band buffer full and therefore unavailable to store display list data. Whether a memory is deemed full may be determined on the basis of a variety of conditions. For example, the compressed band buffer 64 may be deemed full when it has insufficient space to store any of the display list data currently stored in display list memory 60 and still guarantee that the page can be printed successfully. The consolidated memory may be deemed full when it has insufficient space to store another display list object.

When both display list and compressed buffer memories are full, as described, a cycling process is initiated in which display lists for one or more bands are rendered. Decompression engine 56 determines if any data in compressed band buffer 64 corresponds to a band to be rendered in the cycling process. If so, decompression engine 56 decompresses the compressed bitmaps and stores them in a band in uncompressed band buffer 62. Thereafter, render engine 52 renders all display lists associated with the same band, whether stored in the display list memory or in the compressed band buffer, into the band data (if any) in the uncompressed band buffer 62, resulting in a single bitmap for a given band. Subsequently, the band bitmap may be compressed and stored in the compressed band buffer.

The cycling process may result in free space in the compressed band buffer, which may later be allocated by the memory manager to store display list data. The operation of memory manger 58 and the advantages of this architecture provides in regard to cycling is described in greater detail below with respect to FIGS. 2a and 2b.

Figure 2A:
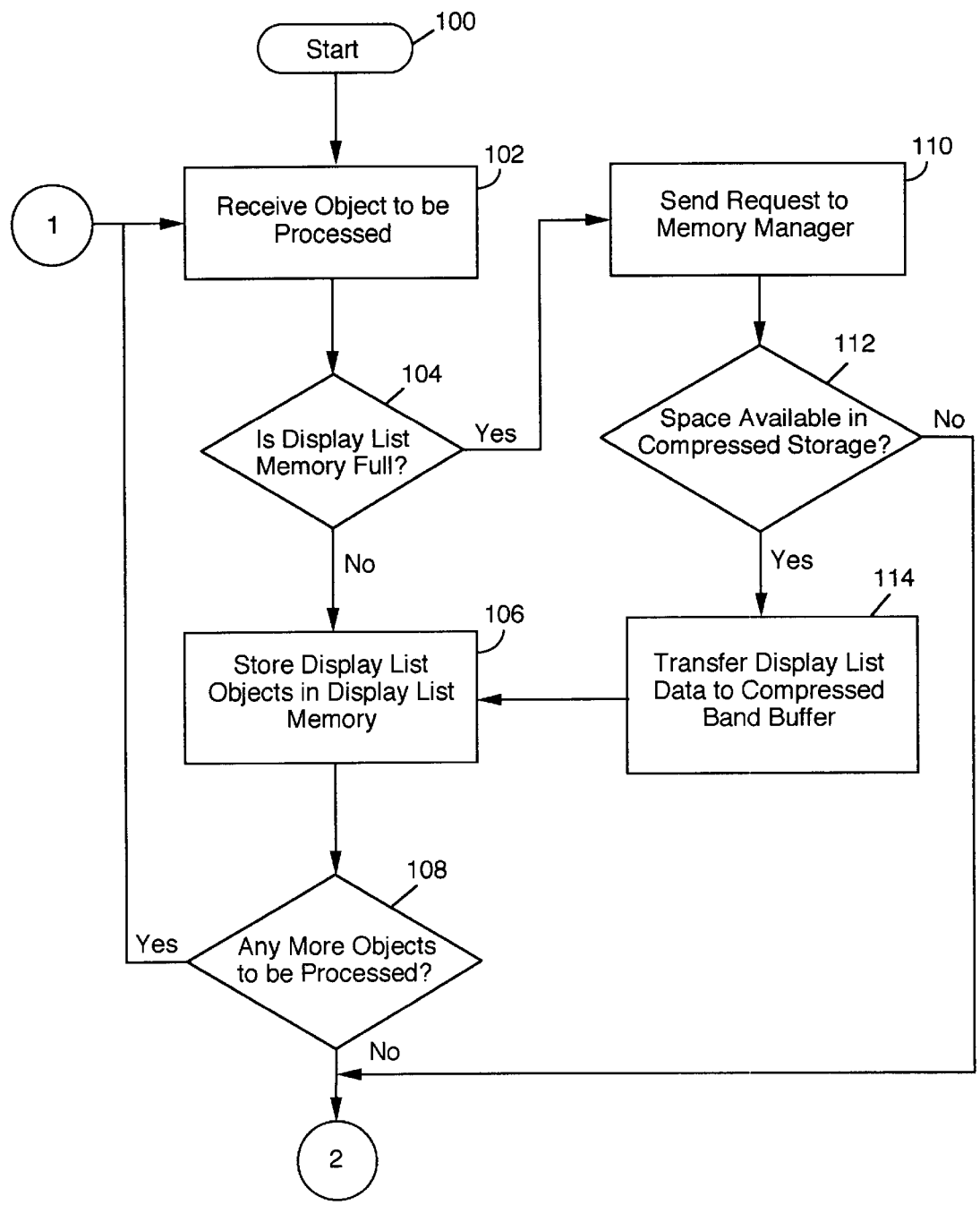
FIGS. 2a and 2b are a flow chart of a process for optimizing memory usage in a printer according to the invention.
Figure 2B:
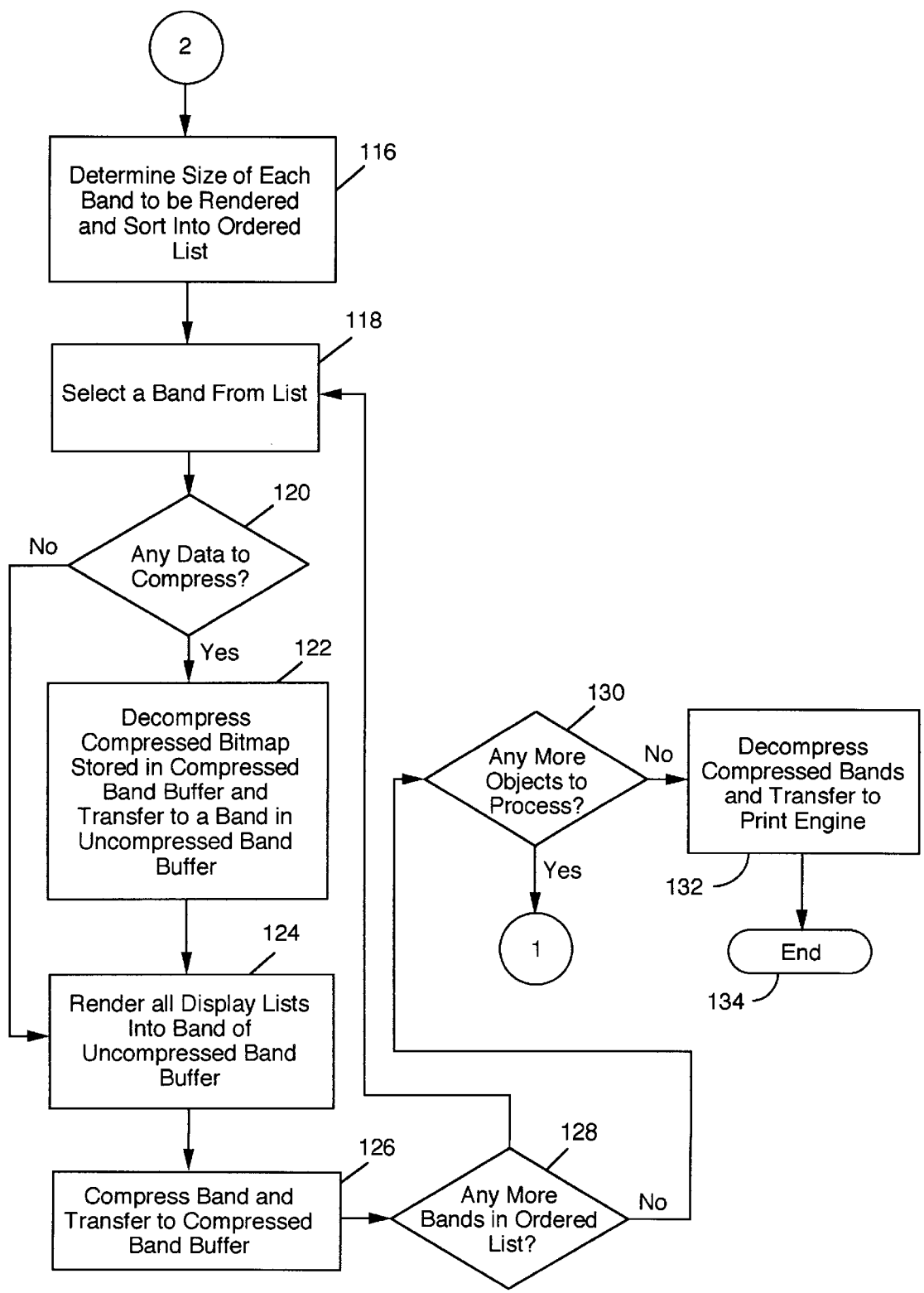

Referring now to FIGS. 1, 2a and 2b, a process of printing a page begins at step 100. An object associated with the page is received by interpreter 50 (102). As each object is processed, a check is made to determine if display list memory is full (104). If not, display list objects associated with the received object are stored in their associated display lists in display list memory (106). A check is made to determine if this is the last object to be processed for the page (108). If so, the process continues at step 116. If more objects are to be processed, the process continues upon receipt of a next object at step 102.

When display list memory 60 is full, a request is sent to memory manager 58 (110). Memory manager 58 determines whether space is available in compressed band buffer 64 (112), as has been described. If space is available, memory manager 58 transfers display list data from the display list memory to the compressed band buffer (114). Some or all of the display list data stored in display list memory may be transferred, thereby freeing display list data storage space in memory. Thereafter, display list objects associated with the received object may once again be stored in display list memory (106). The process continues at step 108.

In step 116, render engine 52 determines the size of each band to be rendered, sorts the bands by size, and identifies the bands in an ordered list (116). The render process for display lists is performed in order. In one embodiment, the bands are rendered largest to smallest. Alternatively, the bands may be classified as either small or large depending on their respective size relative to a predefined threshold band size. Thereafter, the large bands may be rendered in preference to the small bands. The size of a band for this purpose is the sum of the size of the display lists for the band (i.e., the amount of memory used to store those display lists) and the size of the band in the compressed band buffer, if any of the band was previously rendered. By rendering the largest bands first, the largest amount of free space may be made available for the storage of compressed data in the compressed band buffer.

Thus, a band is selected from the ordered list (118). The decompression engine checks whether the selected band has any previously-compressed data stored in the compressed band buffer (120). If it does, the decompression engine decompresses the band's compressed data and transfers the decompressed data to the uncompressed band buffer (122).

In step 124, render engine 52 renders display lists stored in the display list memory and any display lists stored in the compressed band buffer into the uncompressed band buffer. If data for the band was already in the uncompressed band buffer, the render engine renders the display lists associated with the band into the same band of the uncompressed band buffer to produce a single bitmap for the band. Thereafter, compression engine 54 compresses the data in uncompressed band buffer 62 for storage in compressed band buffer 64 (126). The compression may be lossless or may require the use of a lossy compression algorithm in order to fit all the data objects for a given band into the space available in the compressed band buffer.

Prior to compression of a band from the uncompressed band buffer, compression engine 54 determines if sufficient space exists in the compressed band buffer to store the band (assuming a lossless compression technique is used). If not, then all bands stored in the compressed band buffer are decompressed and recompressed with lossy compression. The new band may then be stored with lossy compression in the compressed band buffer. All future bands are thereafter stored in the compressed band buffer with lossy compression, resulting in a "lossy page".

After the compression step, a check is made to determine if more bands remain to be processed (128). If so, the process continues at step 118. If all the bands have been processed, the process continues at step 130, where a check determines whether this is the last object to be processed for the page (130). If not, the process continues back at step 102.

When all objects have been processed (step 130), the bands are decompressed in display order and passed to the print engine as required (132). This step may be refined to avoid any unnecessary compression followed by immediate decompression of a particular band.

In the event that the display list memory is full and the compressed buffer memory is also full as indicated at step 112, then a cycling process is initiated at step 116 resulting in the freeing of space in the display list memory by rendering the display list data stored therein. Cycling is only initiated when both the display list memory and the compressed band buffer are full, thereby minimizing the frequency of cycling operations. By minimizing cycling operations, unnecessary compression may also be avoided.

The present invention has been described in terms of specific embodiments, which are illustrative of the invention and not to be construed as limiting. The invention may be implemented in hardware, firmware or software, or in a combination of them. Other embodiments are within the scope of the following claims.

What is claimed is:

1. A method for allocating memory usage in a visual output device having a render engine, a display list memory for storing display list objects and a compressed band buffer memory for storing compressed bitmap data rendered by the render engine, the method comprising:

storing display list objects in the display list memory; and detecting that the display list memory is full and upon detecting such and determining that the compressed band buffer memory is not full, transferring one or more of the display list objects from the display list memory to the compressed band buffer memory without rendering and without compressing the display list objects thereby freeing space in the display list memory for more display list objects.

2. The method of claim 1 wherein the visual output device is a printing device configured to receive and process page description language input describing a page to be printed.

3. The method of claim 2 wherein the page description language input is written in the PostScript language.

4. The method of claim 2 wherein the page description language input is written in the PCL language.

5. The method of claim 2 further comprising:

performing a cycling process transforming display list objects into rendered data for storage in the compressed band buffer memory when both the display list memory and the compressed band buffer memory are deemed full for the purpose of storing further display list objects and releasing a memory space occupied by the display list objects rendered by the cycling process.

6. The method of claim 5 where the cycling process includes:

determining a band size for each band having display list objects stored in the display list memory or the compressed band buffer memory; and performing the cycling process for large bands in preference to small bands.

7. The method of claim 6 where the band size is the sum of the amount of memory occupied by the display lists for the band and the amount of memory already occupied by the band in the compressed data buffer memory.

8. The method of claim 6 where the step of rendering a band includes:

decompressing compressed band data for the band from the compressed band buffer memory and storing the result in an uncompressed band buffer memory; and rendering each display list for the band into band data stored in the uncompressed band buffer memory.

9. The method of claim 2 wherein the compressed band buffer memory is deemed full if insufficient space exists in compressed band buffer memory to store any of the display list objects from display list memory.

10. The method of claim 2 wherein the compressed band buffer memory is sized to store a worst-case single page in its most compressed form.

11. A method for allocating memory usage in a printer configured to receive a page description language description of a page to be printed and having a display list memory for storing display list objects and a compressed band buffer memory for storing compressed bitmaps rendered by the printer, the method comprising:

interpreting page description language input into display list objects stored in display lists in the display list memory of the printer until one or more of the display lists in the display list memory is deemed full;

transferring one or more of the display list objects from the display list memory to the compressed band buffer memory without rendering and without compressing the display list objects in response to the display list memory being deemed full before continuing to interpret page description language input, unless the compressed band buffer memory is deemed full.

12. The method of claim 11, further comprising the steps of:

rendering one or more of the display list objects into an uncompressed band buffer memory when both the display list memory and the compressed band buffer memory are deemed full, whereby memory space is made available to continue interpreting page description language input into display list objects stored in display lists in the display list memory.

13. A method for allocating memory usage in a printer configured to receive a page description language description of a page to be printed and having a consolidated memory partitioned to store both display list objects and bitmaps rendered by the printer in respective separate portions of the consolidated memory, the method comprising:

interpreting a page description language input into display list objects to be stored in a first portion of the consolidated memory until the first portion of the consolidated memory dedicated to store display list objects is deemed full; and transferring without rendering and without compressing one or more of the display list objects into a second portion of the consolidated memory dedicated to store rendered bitmaps if the second portion of the consolidated memory is not deemed full, whereby memory space is made available to continue interpreting the page description language input and storing display list objects in the first portion of the consolidated memory without having to render the transferred display list objects.

14. The method of claim 13, further comprising compressing a band of data from the uncompressed band buffer memory and storing the resulting compressed band in the consolidated memory.

15. The method of claim 13, further comprising decompressing a compressed band from the consolidated memory into the uncompressed band buffer memory before rendering further display list objects into the band and then compressing the resulting band and storing a resulting compressed band in the consolidated memory.

16. A printer configured to receive a page description language description of a page to be printed, comprising:

an interpreter connected to receive a page description language input and operating to generate display list objects and cause the display list objects to be stored in a display list memory;

a rendering engine coupled to the display list memory and operating to receive the display list objects stored in the display list memory and to render the objects into an uncompressed band buffer memory, being a memory for storing at least one band of rendered data in uncompressed form;

a data compression engine coupled to the uncompressed band buffer memory and operating to receive and compress rendered data from the uncompressed band buffer memory and to store compressed data in a compressed band buffer memory, the compressed band buffer memory being sufficiently large to store any full page in some compressed form; and a memory manager connected to receive a signal indicating that the display list memory is full and operating in response to the signal to transfer one or more of the display list objects from the display list memory to the compressed band buffer memory without rendering and without compressing the display list objects unless the compressed band buffer memory is also full.

17. A method for allocating memory usage in a visual output device having a render engine, a display list memory for storing display list objects and a compressed band buffer memory for storing compressed bitmap data rendered by the render engine, the method comprising:

storing display list objects in the display list memory;

allocating space in the compressed band buffer memory to store the display list objects;

detecting that the display list memory is full and upon detecting such and determining that the compressed band buffer memory is not full, transferring display list objects from display list memory to the compressed band buffer memory without rendering and without compressing the display list objects, thereby freeing space in the display list memory for more display list objects.

* * * * *